United States Patent

Paschke et al.

[11] Patent Number: 6,108,985
[45] Date of Patent: Aug. 29, 2000

[54] SLIDE MOUNT FOR TELESCOPIC PARTS

[75] Inventors: Franz Paschke, Sande; Kurt Vohdin, Zetel; Manfred Wilts, Schortens; Hans Neumann, Wangerland/Hooksiel, all of Germany; Gerd Erdmann, Unterägeri, Switzerland

[73] Assignee: Grove, U.S.L.L.C., Shady Grove, Pa.

[21] Appl. No.: 09/156,396

[22] Filed: Sep. 18, 1998

[30] Foreign Application Priority Data

Sep. 18, 1997 [DE] Germany ............................ 197 41 202

[51] Int. Cl.⁷ .................................................. B66C 23/697
[52] U.S. Cl. ................... 52/118; 52/111; 52/632; 52/726.3; 52/737.1; 212/348; 212/350
[58] Field of Search .............................. 52/117, 118, 115, 52/726.3, 726.4, 737.1, 632, 111; 212/347, 348, 350

[56] References Cited

U.S. PATENT DOCUMENTS

| 3,320,003 | 5/1967 | Edelson et al. . |
| 3,333,513 | 8/1967 | Wettstein . |
| 3,426,926 | 2/1969 | Witwer . |
| 3,516,553 | 6/1970 | Reske . |
| 3,620,579 | 11/1971 | Brown et al. . |
| 3,690,742 | 9/1972 | Sung . |
| 3,719,403 | 3/1973 | Sung . |
| 3,719,404 | 3/1973 | Sterner . |
| 3,748,807 | 7/1973 | Sterner . |
| 3,782,790 | 1/1974 | Benkowski . |
| 4,148,531 | 4/1979 | Hornagold . |
| 4,168,008 | 9/1979 | Granaryd . |
| 4,337,601 | 7/1982 | Vaerk et al. . |
| 4,357,785 | 11/1982 | Eklund . |
| 4,478,014 | 10/1984 | Poock et al. . |
| 4,913,062 | 4/1990 | Burke . |
| 5,158,189 | 10/1992 | Watson . |
| 5,540,017 | 7/1996 | Eilam et al. .............................. 52/118 |
| 5,624,047 | 4/1997 | Challberg et al. . |
| 5,850,713 | 12/1998 | Hojo ..................................... 52/118 X |
| 5,865,328 | 2/1999 | Kaspar . |

FOREIGN PATENT DOCUMENTS

| 2113835 | 6/1972 | France . |
| 2317595 | 10/1974 | Germany . |
| 2303644 | 11/1974 | Germany . |
| 2742536 | 3/1978 | Germany . |
| 3101017 | 8/1982 | Germany . |
| 29613042 U1 | 7/1996 | Germany . |
| 29613042 U | 9/1996 | Germany . |
| 5922889 | 6/1984 | Japan . |
| 458620 | 5/1992 | Japan . |
| 2082143 | 3/1982 | United Kingdom . |
| 2128957 | 5/1984 | United Kingdom . |

*Primary Examiner*—Carl D. Friedman
*Assistant Examiner*—Yvonne M. Horton

[57] ABSTRACT

The invention relates to a slide mount for telescopic parts, more particularly for crane jibs, including a slipper arranged between the sliding surface areas of the telescopic parts, the slipper being configured so that it is held in place by a wedge effect between the telescopic parts, and the slipper including on its inner and/or outer surface area longitudinal grooves receiving compensating, spacer elements, preferably, elongated strips.

21 Claims, 2 Drawing Sheets

SLIDE MOUNT FOR TELESCOPIC PARTS

BACKGROUND OF THE INVENTION

1. Field of the Invention

The invention relates to a slide mount for telescopic parts comprising an adjustable slipper of substantially large surface area, disposed between the sliding surface areas of the telescopic parts.

2. Description of the Prior Art

Telescopic jibs such as, for example, those of stationary or mobile cranes are made up of several nested telescopic parts which can be extended in lengthening the jib. The telescopic parts are slidably mounted in each other, the inner telescopic part being guided in a collar secured to the front section of the outer telescopic part and in the base portion of the inner telescopic part at the shank piece of the outer telescopic part. Extension of the inner telescopic part thus results in mounting loads in the collar of the outer telescopic part and in the base portion of the inner telescopic part which attain peak values at the base of the collar and at the top of the base portion of the inner telescopic part.

To enable the telescopic parts to be extended and to handle the cited mounting loads, prior art provides a slide mount in each case between the two telescopic parts. For example, in the lower collar region and in the upper rear base region of a substantially rectangular beam, slipper blocks are inserted in the corners and are adapted to the shape of the gap between collar and inner telescopic part and on which the telescopic parts are able to slide on and in each other.

The drawback in the case of slipper blocks provided only in the corners is the fact that introducing the force from the inner telescopic part into the collar mainly takes place over only a portion of the existing surface area of the sliding blocks, mainly in the outer slipper surface areas adjoining the downsweeps of the inner telescopic part. Due to the resulting high contact pressure forces in conjunction with the minor width in this case a relatively long slipper is needed which may necessitate compensation in the longitudinal axis of the jib. In addition to this additional bending stresses occur in the downsweep portion of the inner telescopic part as a function of the bending radius and material of the slipper. Furthermore, the slipper blocks need to be designed to stay in position, for example, by adapting surface curvature downsweep relatively precisely, or by scalloping the collar to receive the blocks.

From DE 296 13 042 U1 a slide mount for nested dish-shaped bodies is known and intended for use in the telescopic jib of a mobile crane. This slide mount consists of dished strips of a plastics material or some other material having good sliding properties, the strips or plates comprising slats articulately connected to each other by their longitudinal sides. What is proposed in this case is thus a kind of "sliding chain" interposed between the telescopic parts.

Such chain-like slide mounts have the drawback that, unless special precautions are taken, they fail to remain in place, i.e. they tend to become displaced in the circumferential direction of the telescopic parts, this being the reason why, for instance, stops need to be provided against the movement of these slide mounts between the telescopic parts.

A further disadvantage of this mounting design and also of the block mount cited above is that adapting the slippers to special requirements, for instance deviations in production (tolerances) or influencing the location of the telescopic parts with respect to each other via the slide mounts is highly complicated, since the slide mounts have a given position and thickness which cannot be simply adapted or changed.

SUMMARY OF THE INVENTION

It is the object of the invention to provide a slide mount for telescopic parts which is no longer hampered by the aforementioned drawbacks, it being intended, more particularly, to assure that the slippers stay in place and to define a slide mount design which is adaptable and simple to produce.

This object is achieved in accordance with the invention by the slipper of the slide mount disposed between the sliding surface areas of the telescopic parts being configured so that due to the wedge effect between the telescopic parts it is held in place and that the slipper comprises on its inner and/or outer surface area longitudinal grooves which receive compensating, spacer elements, preferably elongated strips.

One of the advantages of the slide mount configuration in accordance with the invention is its ability to stay in place. Due to the slipper being adapted to the shape of the telescopic parts it is no longer able to become displaced in the circumferential direction of the cross-section following insertion of the inner telescopic part on the slipper in the outer telescopic part, especially when profiles are used having kinks or abrupt bends in the cross-section.

A further major advantage of the slide mount in accordance with the invention is its adaptability. Due to production tolerances the surfaces of the telescopic parts are not always finished such that a slipper which is the same in thickness all over is able to fill out the gap as a whole between the slippers which in turn would result in a deterioration in guiding the inner telescopic part as well as an irregular application of forces. The compensating, spacer elements incorporated in the longitudinal grooves of the slipper in accordance with a method of the invention may be dimensioned in thickness, however, so that mounting is consistent over the full surface area of the slipper, thus eliminating any additional bending stresses in the telescopic part due to inconsistent distribution of loads.

Adapting the thickness of the slipper at selected location can be undertaken relatively simply, this namely merely requiring compensating, spacer elements of a suitable thickness to be inserted at the selected circumferential section, thereby simplifing handling such slippers.

However, the good adaptability of the slide mounts in accordance with the invention also proves to be of advantage when the telescopic parts need to be oriented with respect to each other. In this case, by selecting compensating elements differing in thickness at suitable circumferential positions it is possible to directly influence orientation of the telescopic parts.

It is furthermore of advantage that by suitably selecting differing materials or varying the contact surface areas of the compensating elements, adjusting the stiffness in various portions of the sliding guide can be undertaken to accommodate likely stress patterns along the slipper. The resulting favorable load distribution enhances the stability of the full cross-section in the load application portion.

In all, therefore, mounting an extensible telescopic part can be influenced to a great extent by the slide mount design in accordance with the invention and thus the load handling response of the jib as a whole substantially improved. It is especially in the mounting portion in which high loads occur that disturbing factors and additional moments of force can thus be counteracted.

Preferably the compensating elements are flat, elongated strips having a rectangular cross-section.

More particularly in the case of crane jibs, the telescopic parts of which feature at the front end a collar for receiving an inner telescopic part, slippers in accordance with the invention are preferably arranged in the front lower portion of the collar and/or in the upper base portion of the inner telescopic part.

The compensating elements in the longitudinal grooves of the slipper are preferably dimensioned somewhat thicker than the depth of the longitudinal grooves, as a result of which the compensating, spacer elements are caused to stand out beyond the surface area provided by the grooves, i.e. an air gap materializing between the positions of the slipper surface featuring no grooves for receiving the compensating elements and the adjacent surface area of the telescopic part. Since the slipper does not end at the top with a compensating element, it instead protruding by a defined amount, a smooth transition is assured which positively influences the response of the inner telescopic part in the load application portion.

Advantageously, the height of the compensating elements may be adapted in each case to the width of the gap between the telescopic parts, as a result of which a consistent contact over the fall cross-section is attained. Each compensating element is then in contact with the slipper as well as with the adjacent collar, the groove guides preventing the compensating element from tangentially shifting out of place.

In one embodiment of the present invention the slipper, essentially adapted to the shape of the telescopic parts, extends over the full mounting cross-section under load. As aforementioned this loaded mounting cross-section will form in each case a substantially U-shaped section in the front lower mounting portion of the collar and in the rear upper mounting portion of the inner telescopic part.

In accordance with a preferred embodiment of the slide mount in accordance with the invention the compensating elements are arranged on the side of the slipper facing the outer telescopic part.

Hereinabove an embodiment of the slide mount in accordance with the invention has been discussed in which the slipper is configured in one piece. However, there is also the possibility of configuring such slippers in more than one piece.

In such a "multi-part embodiment" the slipper of the slide mount is made up of several shaped parts preferably butting against each other by their longitudinal edges, thereby in turn assuring a uniform mount.

Multi-parting the slipper is done from considerations as to function and cost-effectiveness, i.e. how many individual parts are employed will depend on the particular application, the means available for their production and stability criteria.

It is natural that the material selected for the slippers needs to assure good long-term sliding properties, a polyamide being used, for instance. Depending on the stiffness needed the compensating elements may consist of differing materials, preferably polyamide or steel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood by the accompanying drawings which are given by way of illustration only, and thus are not limitative of the present invention, and wherein.

DESCRIPTION OF THE PREFERRED EMBODIMENTS

Figure 1:
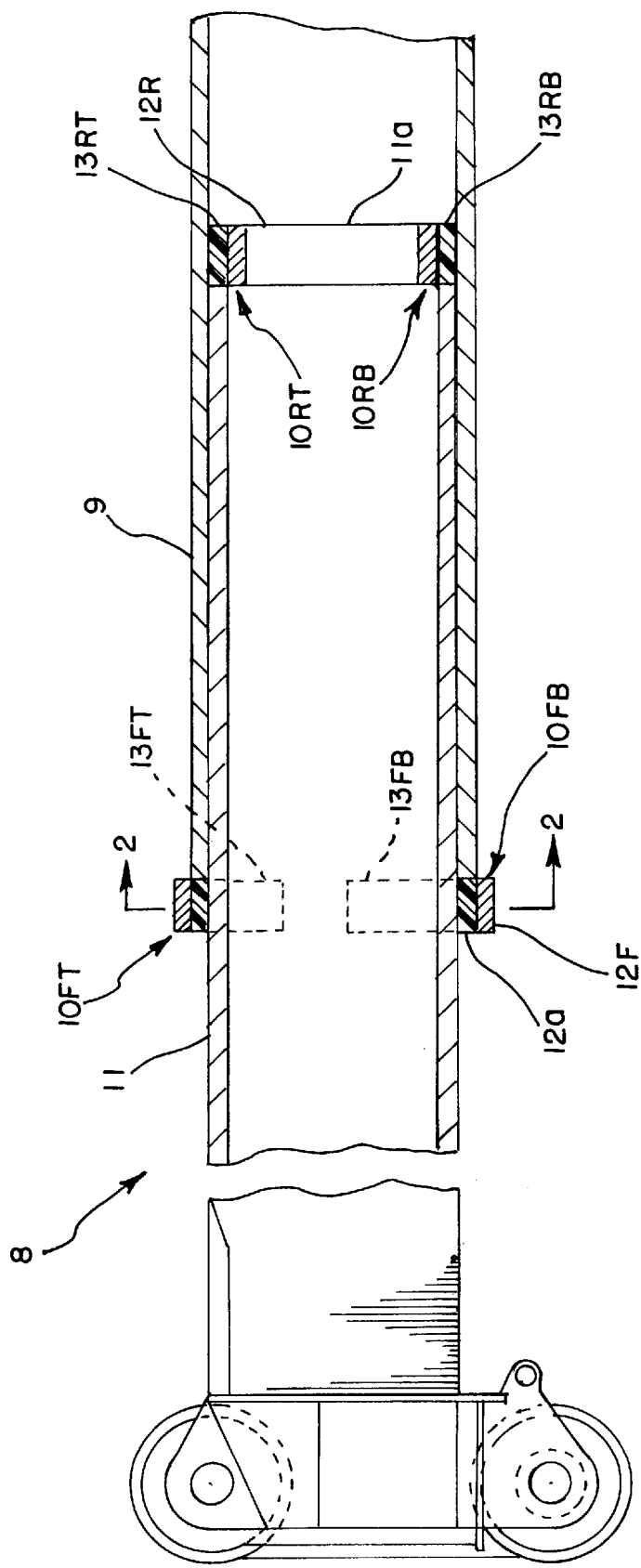
FIG. 1 is a side elevational view partially in section of a crane jib with slide mount assemblies of the present invention installed therein.

Referring to FIG. 1 there is illustrated a telescopic jib for a crane generally indicated 8. An outer telescopic part 9 is provided with a collar 12F on an outboard end thereof. Inner telescopic part 11 fits for sliding movement within collar 12F. Collar 12F may be a separate part welded to the end of outer telescopic part 9, and extends outwardly therefrom in a radial direction. Inner telescpic part 11 is also provided with a collar at the base end 11a. Collar 12R may be welded to end 11a to extend inwardly thereof in a radial direction. Slide mount assembly 10 include sub assemblies. 1OFT, 10FB, 1ORT and 1ORB of the present invention including slippers 13 are wedged between the inner surface of collars 12F and 12R and the outer surface of inner telescopic part 11. When the jib is under load, peak stresses occur at the top of the base 11a of inner telescopic part 11 and at the bottom surface 12a of the collar 12F. The slippers 13 are wedged tightly between collars 12F, 12R and the inner telescopic part 11 as explained in more detail with respect to FIG. 2, so that they will not shift circumferentially. Slippers 13 are provided at the top and bottom of both collars 12F, 12R. Slipper sections 13FT and 13FB are provided at the top and bottom of collar 12F, respectively. Slipper sections 13RT and 13RB are provided at the top and bottom of collar 12R.

Figure 2:
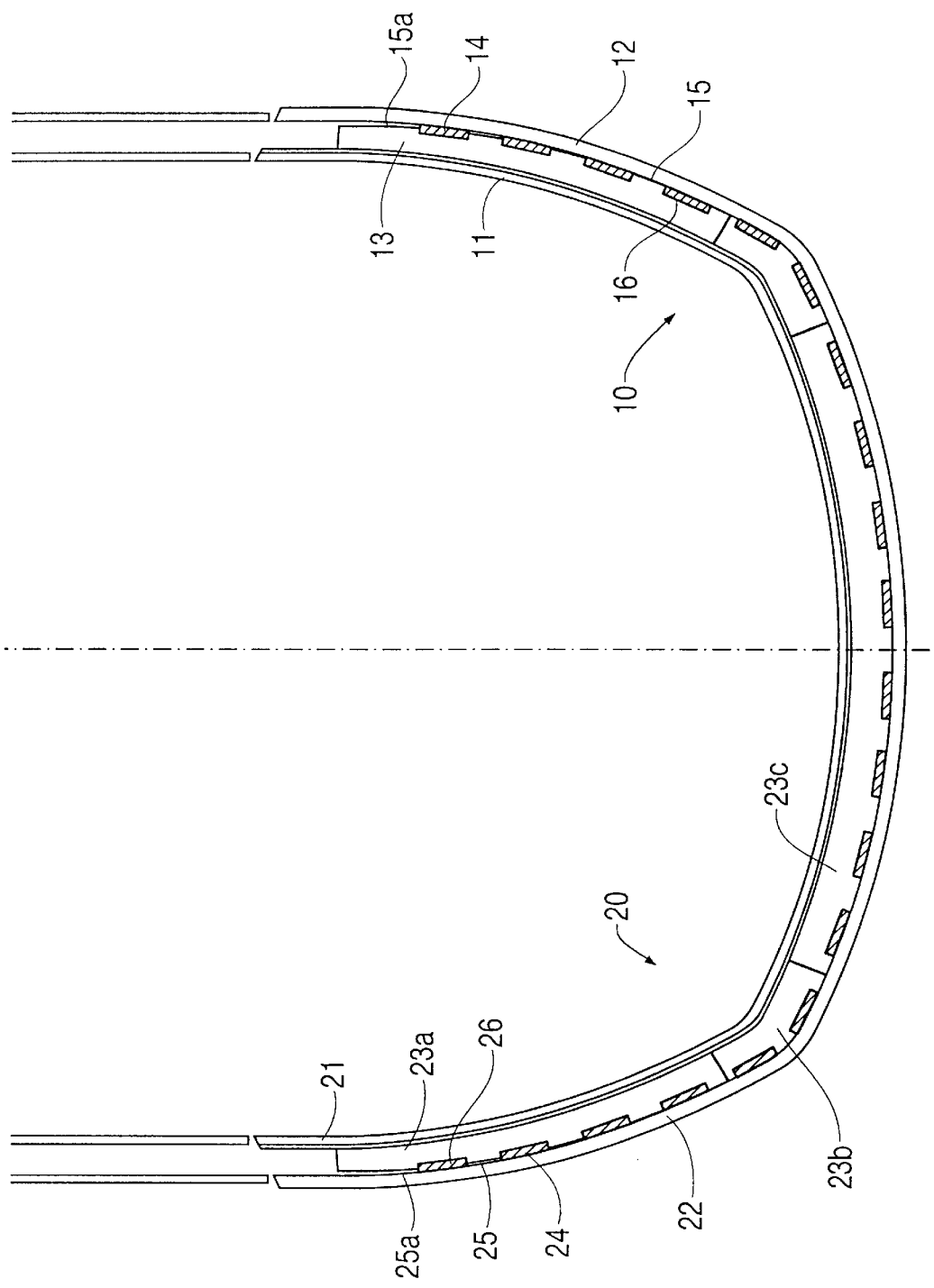
FIG. 2 is a partial and split cross-sectional view along lines 2—2 of FIG. 1 depicting two embodiments of slide mount assemblies wedged between an inner telescopic part of the jib and a surrounding collar.

In the split drawing of FIG. 2 the cross-section of the crane jib is illustrated in partial section as viewed along lines 2—2 of FIG. 1. The cross-section of the jib is a polygon and as illustrated has rounded corners at least at the bottom portion and optionally at the top portion also. That is, the cross-section may symmetrical about a horizontal axis extending through the illustration of FIG. 2. However, the top half of the jib alternatively may be rectangular with 90 degree corners. In either case the slipper 13 is conformably shaped to the opposed surfaces of collar 12 and the inner telescopic part 11 to stop circumferential shifting prevented by the kinks or corners.

Illustrated in the right-hand half-section of the FIG. 2 is the "one-part" embodiment of a slide mount 10 in accordance with the invention, showing the front, lower part of the mounting arrangement, i.e., for example, the front, lower part of a collar 12 of an outer telescopic part as well as the inner telescopic part 11 mounted in the collar 12, it being the slipper 13 which provides for mounting the telescopic part 11 in the collar 12. The slipper 12 has an outer contour substantially adapted to the two opposed surfaces of the contour of the collar 12 and of the telescopic part 11. In the example shown the lower collar shape is kinked. Due to the wedge effect resulting between the inner telescopic part 11 and the collar 12 the slipper 13 is no longer able to slip out of place circumferentially once it has been inserted between these two parts, i.e. it stays in place.

At its outer surface, i.e. the surface facing the collar, the slipper 13 comprises longitudinal grooves 16 extending perpendicular to the plane of the drawing. These longitudinal grooves 16 are configured rectangular. They receive compensating, spacer strips 14, likewise configured rectangular, the height of which is slightly more than the depth of the longitudinal grooves 16.

The height of the compensating, spacer strips 14 must not necessarily be the same for all strips, it may be adapted to the contour, i.e. the actual width of the gap between the collar 12 and the telescopic part 11 at the locations concerned so that mounting contact is made possible over the full circumference.

In this arrangement the load distribution, i.e. the application of the forces involved, is circumferentially equalized. At locations where the slipper 13 comprises no longitudinal grooves on its outer contour, an air gap remains between the inner wall of the collar and the outer surface area of the slipper 12. One such air gap is identified by the reference numerals 15 and 15a. Via the cantilever length of the slipper 13 and the width of the air gap 15a, which is a function of the height of the compensating strips 14 inserted juxtaposed, the change in shape of the inner telescopic part can be influenced in the load application portion.

The height of the compensating strips 14, which can be simply inserted in various thicknesses into the slipper 13, can be used to orient the telescopic part 11 and to compensate tolerances. By varying the stiffness of the compensating strips 14 in various circumferential portions, for example by selecting different materials or by varying the contact surface areas, stability can be enhanced due to the more consistent load distribution.

The left-hand half-section of FIG. 2 depicts two multipart embodiment variants 20 of a slide mount in accordance with the invention fitted to the same place on a collar 22 as the slide mount 10 shown in the right-hand halfsection. Located between the collar 22 and the inner telescopic part 21 is in turn the slipper which in this case is configured in multiple parts. The illustration shows three single longitudinal sections 23a, 23b and 23c. The middle section 23b is located roughly in the region of the edge of the beam profile, whilst the two slipper parts 23a and 23c adjoin its longitudinal edges. In this aspect too, the wedge effect between the telescopic part 21 and the collar 22 ensures that the multipart slipper remains correctly positioned.

A multi-part design will be selected when a function and cost-effectiveness analysis speaks in favor of such a design. It may prove to be more cost-effective to produce the slipper parts 23a, 23b and 23c individually than all in a one piece slipper, for instance.

Grooves 26 are also comprised in the outer surface area of the slippers 23a, 23b and 23c facing the collar, these grooves receiving rectangular compensating strips 24 via which contact is provided to the collar 22 and force application. Here too, air gaps 25/25a are provided, for example, between the compensating strips 24. The function of this multi-part mounting configuration 20 is the same in principle as that of the integral mounting design 10, the benefits of which can be attained by the multi-part variant 20.

The material preferred for the slippers or parts thereof is the polyamide marketed by the name "Nylon 6, whilst preference is given to polyamide or steel, i.e. materials having different modules of elasticity, for the compensating strips, depending on the loading requirements involved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A slide mount assembly for telescopic parts comprising:

a shaped slipper disposed between sliding opposed surface areas of the telescopic parts;

said slipper being configured relative to the shapes of the opposed surface areas so that it is held in place circumferentially by a wedge effect between the telescopic parts;

said slipper having longitudinal grooves formed on at least one of the surfaces facing one of the surface areas for accommodating protruding spacer elements therein; and at least one spacer element positioned in at least one of said grooves for selectively positioning said slipper with respect to said telescopic parts.

2. The slide mount assembly as set forth in claim 1, wherein said slipper is arranged in a collar of an outer telescopic part.

3. The slide mount assembly as set forth in any of the claim 1, wherein the height of said at least one spacer element is adapted to the width of the gap between said telescopic parts.

4. The slide mount assembly as set forth in claim 1, wherein said slipper extends over a full loaded mounting cross-section of the telescopic parts.

5. The slide mount assembly as set forth in claim 1, wherein said slipper is formed of several shaped parts which are juxtaposed and abut along their longitudinal edges.

6. The slide mount assembly as set forth in claim 5, wherein said slipper is made of a material having good sliding properties, for example, of polyamide.

7. The slide mount assembly as set forth in claim 6, wherein said spacer elements are made of materials selected from a group consisting of polyamide, aluminum or steel.

8. The slide mount assembly of claim 1, wherein said slipper is made of a material having good sliding properties, for example, of polyamide.

9. The slide mount assembly of claim 8, wherein said spacer elements are made of materials selected from a group consisting of polyamide, aluminum or steel.

10. The slide mount assembly of claim 1 wherein the slipper is arranged in a collar of the inner telescopic part.

11. The slide mount assembly of claim 1 wherein the inner telescopic part has a rear end and a rear collar thereon disposed within the outer telescopic part, and the outer telescopic part has a front collar thereon, and a slipper being arranged in each of the front and rear collars.

12. The slide mount assembly as set forth in claim 1, comprising a plurality of said spacer elements.

13. The slide mount assembly as set forth in claim 1, wherein said spacer element is greater in depth than the groove into which it is positioned.

14. The slide mount assembly as set forth in claim 13, wherein the spacer element is adapted to the width of the gap between the telescopic elements.

15. The slide mount assembly as set forth in claim 12, wherein said spacer elements are of varying depths.

16. The slide mount assembly as set forth in claim 15, wherein said spacer elements are adapted to a varying width of the gap between the telescopic parts.

17. The slide mount assembly as set forth in claim 12, wherein said spacer elements are of varying stiffness.

18. The slide mount assembly as set forth in claim 1, wherein said longitidunal grooves in said slipper extend generally along the direction of movement of the telescopic parts.

19. A method of supporting telescopic parts for stable, sliding movement comprising the steps of:

inserting a slide mount assembly including, a shaped slipper disposed between sliding opposed surface areas of the telescopic parts, said slipper being configured relative to the shapes of the opposed surface areas so that it is held in place circumferentially by a wedge effect between the telescopic parts, said slipper having longitudinal grooves formed on at least one of the surfaces facing one of the surface areas for accommodating protruding spacer elements therein; and selectively installing spacer elements of selected heights in said longitudinal grooves according to various tolerances between the sliding opposed surface areas in regions adjacent the grooves; to thereby ensure a stable fit and a selected load distribution along the slipper.

20. The method of claim 12 including the further step of selecting materials of a selected stiffness for each spacer element in order to accommodate varying stress patterns along the slipper.

21. The method of claim 20, including the further step of selecting materials of varying stiffness for the respective spacer elements.

* * * * *